United States Patent
Yu et al.

(10) Patent No.: US 8,539,826 B2
(45) Date of Patent: Sep. 24, 2013

(54) PRESSURE SENSOR AND NOZZLE ASSEMBLY

(75) Inventors: San-Chuan Yu, Changhua County (TW); Tung-Feng Lin, Nantou County (TW)

(73) Assignee: Cub Elecparts Inc., Changhua County (TW)

( * ) Notice: Subject to any disclaimer, the term of this patent is extended or adjusted under 35 U.S.C. 154(b) by 172 days.

(21) Appl. No.: 13/026,770

(22) Filed: Feb. 14, 2011

(65) Prior Publication Data

US 2012/0204634 A1    Aug. 16, 2012

(51) Int. Cl.
*G01M 17/02* (2006.01)
*B60C 23/02* (2006.01)

(52) U.S. Cl.
USPC .......................................... 73/146.8; 73/146

(58) Field of Classification Search
None
See application file for complete search history.

(56) References Cited

U.S. PATENT DOCUMENTS

| | | | |
|---|---|---|---|
| 7,454,965 B2 * | 11/2008 | Blossfeld et al. | 73/146 |
| 7,536,904 B1 * | 5/2009 | Yu | 73/146.8 |
| 7,587,935 B2 * | 9/2009 | Kempf et al. | 73/146.8 |
| 7,775,095 B2 * | 8/2010 | Yu | 73/146 |
| 7,870,866 B2 * | 1/2011 | Yu | 137/227 |
| 7,886,589 B2 * | 2/2011 | Capdepon et al. | 73/146.8 |
| 8,047,068 B2 * | 11/2011 | Hamm et al. | 73/146.5 |
| 8,074,508 B2 * | 12/2011 | Luce | 73/146.8 |

* cited by examiner

*Primary Examiner* — Andre Allen
*Assistant Examiner* — Jermaine Jenkins
(74) *Attorney, Agent, or Firm* — Muncy, Geissler, Olds & Lowe, PLLC (57) ABSTRACT

An assembly includes a nozzle having a curved contact surface curvedly and downwardly extending from two opposite sides of a linear top ridge of the nozzle, a tire pressure sensor having a connection groove with a curved contact surface complementary in shape to and slidable relative to the curved contact surface of the nozzle, and a bolt for fastening the nozzle with the tire pressure sensor. The curved contact surface of the nozzle is slidably movable relative to the curved contact surface of the tire pressure sensor along a specific direction reciprocally so as to adjust a relative connection angle between the sensor and the nozzle and the nozzle is prohibited to move in the connection groove along other directions. Therefore, the work of using the bolt to fasten the tire pressure sensor to the nozzle can be done easily.

10 Claims, 7 Drawing Sheets

PRESSURE SENSOR AND NOZZLE ASSEMBLY

BACKGROUND OF THE INVENTION

1. Field of the Invention

The present invention relates generally to a tire pressure sensor and more particularly, to a tire pressure sensor and nozzle assembly.

2. Description of the Related Art

A tire pressure sensor is adapted to be installed inside a tire of a car or a motorcycle for detecting the air pressure inside the tire and the temperature thereof and wirelessly transmitting the detected signal to a display to notify the driver or the motorcyclist the real time value of the tire pressure. Generally, the tire pressure sensor is connected with a nozzle, which is mounted to a wheel rim to which the tire is mounted and adapted for connecting an inflation device to inflate the tire with air.

When the assembly of the tire pressure sensor and the nozzle is installed in various wheels of different brands, the relative connection angle between the nozzle and the tire pressure sensor may be required different for fitting. Therefore, the conventional nozzle is provided with a connection portion connected with the tire pressure sensor for adjustment of the relative connection angle. Usually, the connection portion of the nozzle has a ball contact surface and the tire pressure sensor has a connection groove with a shape complementary to that of the ball contact surface. In assembly of the nozzle with the tire pressure sensor, the connection portion of the nozzle is firstly inserted into the connection groove of the tire pressure sensor. Thereafter, the relative connection angle between the nozzle and the tire pressure sensor is adjusted to a desired extend by means of forcing the ball contact surface to turn relative to the connection groove, and then a bolt is used to fasten the nozzle with the tire pressure sensor. This conventional design of the tire pressure sensor and nozzle assembly may fulfill the requirement of angle adjustment; however, because the ball-shaped connection portion of the nozzle tends to turn in the connection groove of the tire pressure sensor in a random direction, the work of using the bole to fasten the nozzle with the tire pressure sensor can not be done conveniently.

SUMMARY OF THE INVENTION

The present invention has been accomplished in view of the above-noted circumstances. It is therefore the primary object of the present invention to provide a tire pressure sensor and nozzle assembly that can improve the above-mentioned drawback.

To achieve the above-mentioned object, a tire pressure sensor and nozzle assembly provided by the present invention comprises a nozzle, a tire pressure sensor and a bolt for fastening the tire pressure sensor to the nozzle. The nozzle includes a connection portion having a linear top ridge, a bottom portion opposite to the linear top ridge, and a curved contact surface which curvedly and downwardly extends from two opposite sides of the linear top ridge towards the bottom portion. The tire pressure sensor includes a housing having a connection groove in which the connection portion of the nozzle is disposed. The connection groove has a curved contact surface which is complementary in shape to and slidable relative to the curved contact surface of the connection portion of the nozzle. The bolt penetrates through the curved contact surface of the housing of the tire pressure sensor and the curved contact surface of the connection portion of the nozzle to fasten the nozzle and the tire pressure sensor together.

By means of the above-mentioned technical features of the tire pressure sensor and nozzle assembly of the present invention, when the bolt has not been tightened to enable the tire pressure sensor to move relative to the nozzle, the curved contact surface of the connection portion of the nozzle can be forced to slidably move relative to the curved contact surface of the connection groove of the tire pressure sensor along the extending direction of the curved contact surface of the connection portion reciprocally, such that the relative connection angle between the sensor and the nozzle can be adjusted to a desired extent, and the nozzle is prohibited to move relative to the sensor along any direction other than the extending direction of the curved contact surface of the connection portion of the nozzle. After the relative connection angle between the sensor and the nozzle has been adjusted to the desired extent, the work of using the bolt to fasten the tire pressure sensor to the nozzle can be done easily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
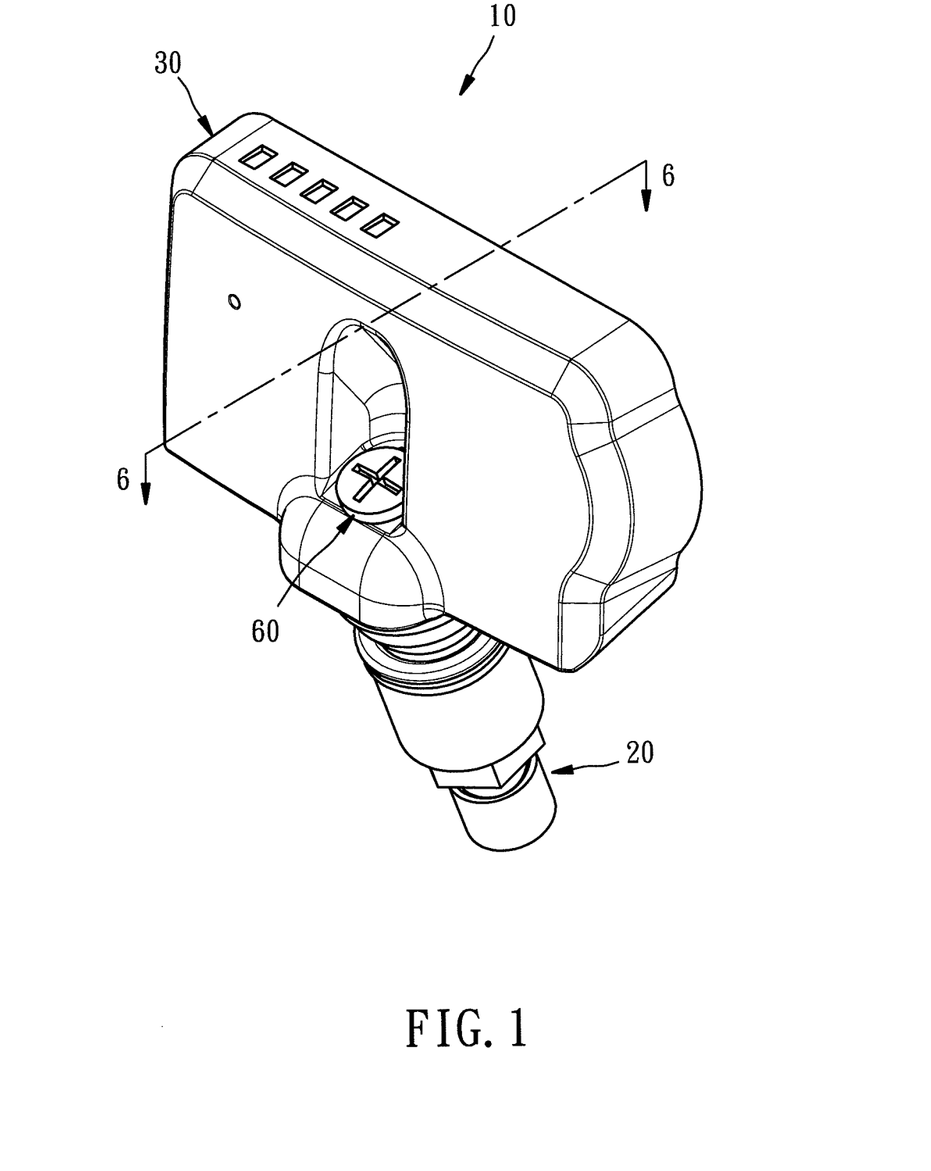
FIG. 1 is a perspective view of the tire pressure sensor and nozzle assembly according to a preferred embodiment of the present invention.
Figure 2:
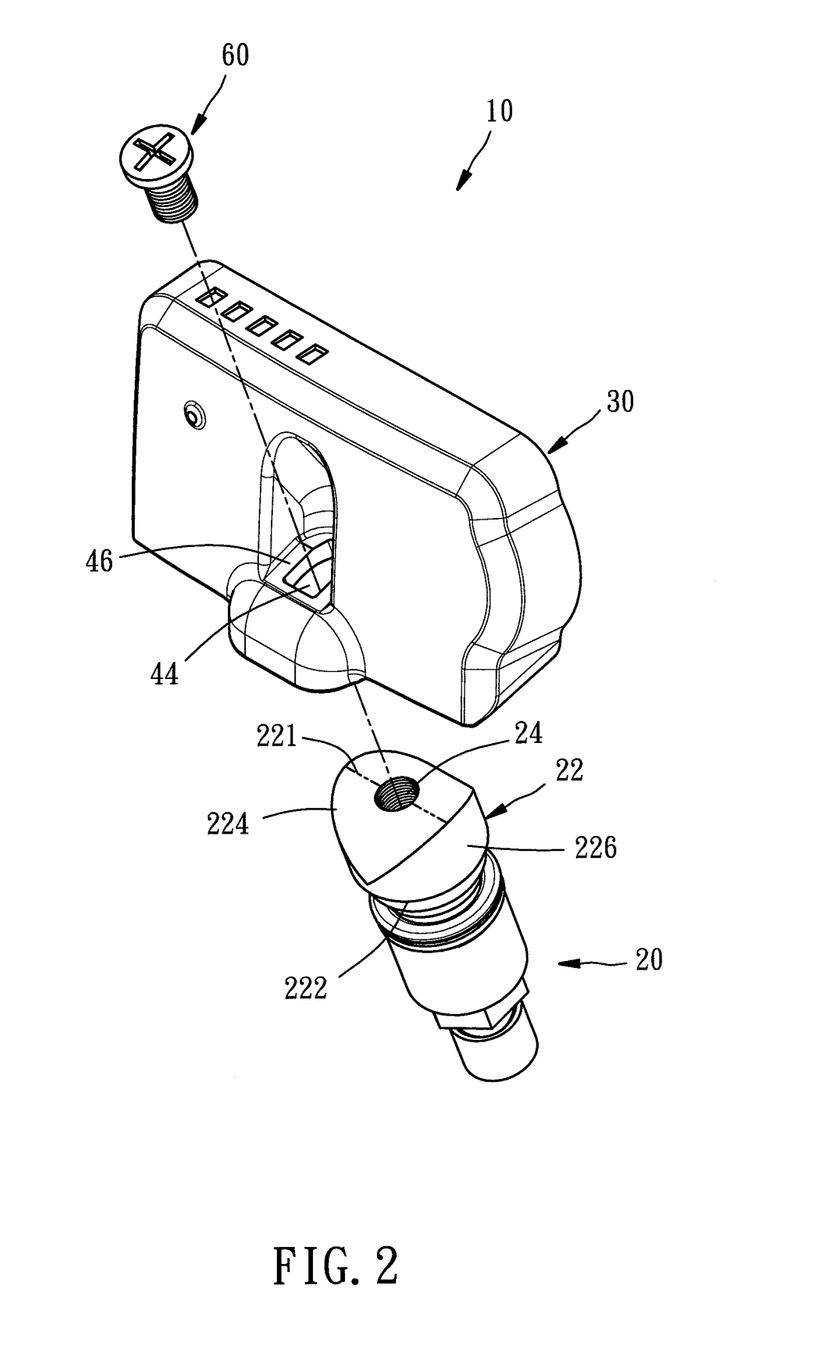
FIG. 2 is an exploded view of the assembly according to the preferred embodiment of the present invention.
Figure 3:
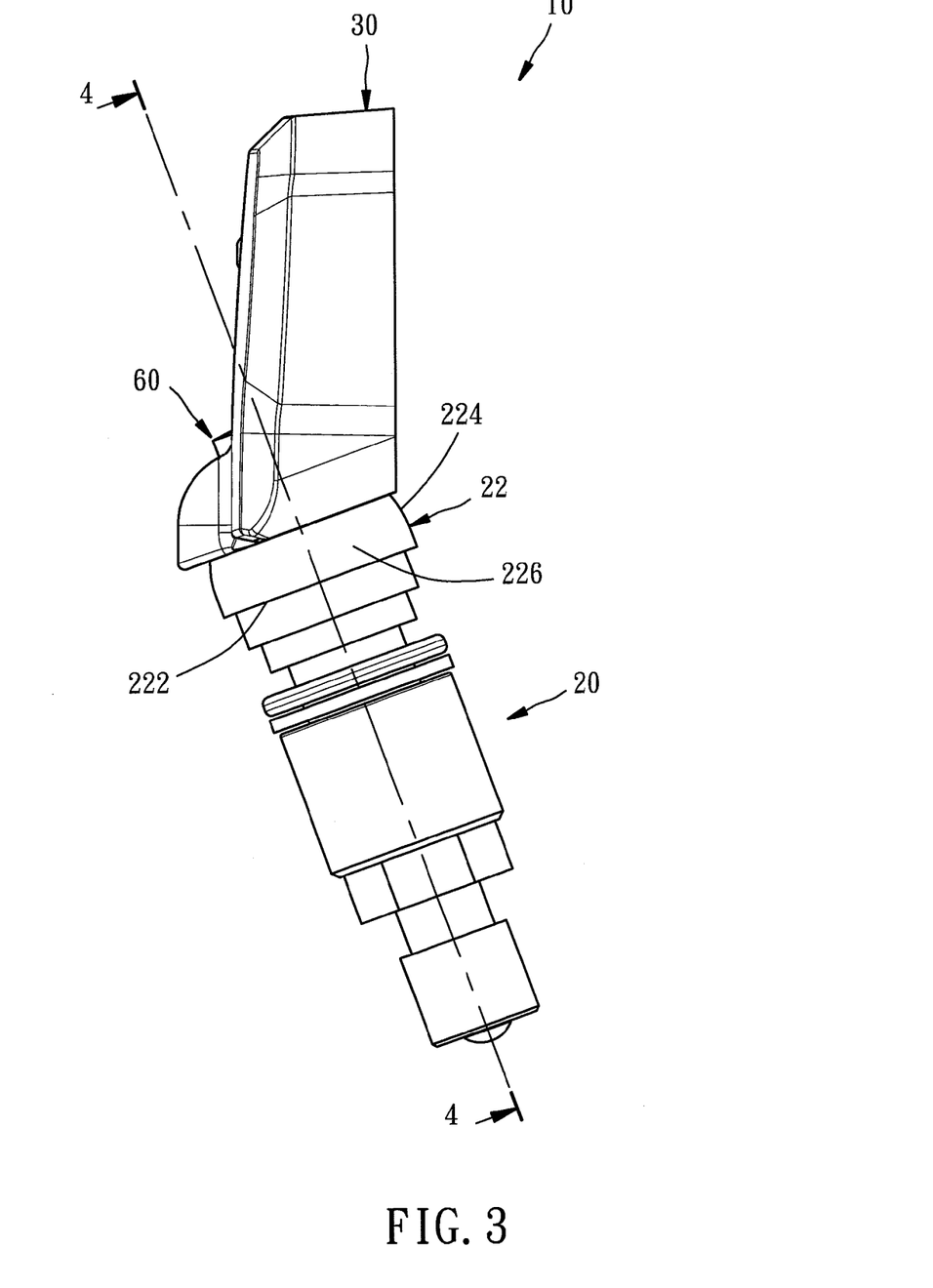
FIG. 3 is a lateral side view of the assembly according to the preferred embodiment of the present invention.

Referring to FIGS. 1-3, the tire pressure sensor and the nozzle assembly, denoted by reference numeral 10 and provided by a preferred embodiment of the present invention, comprises a nozzle 20, a tire pressure sensor 30 and a bolt 60.

Figure 4:
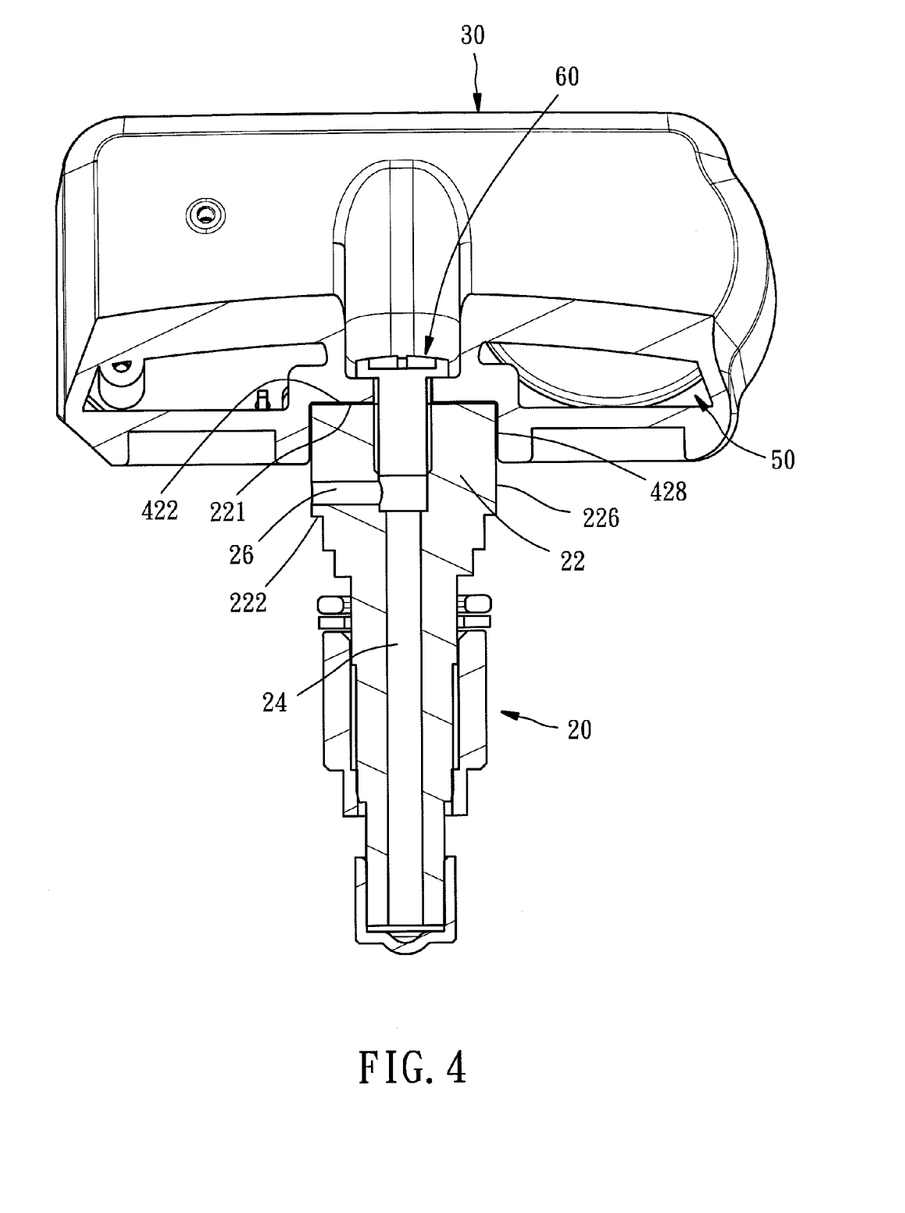
FIG. 4 is a sectional view taken along line 4-4 of FIG. 3.

The nozzle 20 includes a connection portion 22 that has a top ridge 221, a bottom portion 222 opposite to the top ridge 221, a curved contact surface 224, and a curved stop surface 226. The top ridge 221 has a linear shape, as shown in FIGS. 2 and 4. The curved contact surface 224 extends curvedly and downwardly from two opposite sides of the linear top ridge 221 towards the bottom portion 222. The curved stop surface 226 extends orthogonally with respect to the linear top ridge 221 from the periphery edge of the curved contact surface 224 to the bottom portion 222.

Specifically speaking, the connection portion 22 is configured like a solid cylinder with a truncated top portion shaped as the curved contact surface 224. In addition, the nozzle 20 includes a through hole 24 extending from the linear top ridge 221 and the curved contact surface 224 of the connection portion 22 to the bottom end face of the nozzle 20, and a transversely extending inflation hole 26 having an inner end communicated with the through hole 24, and an outer end located on the curved stop surface 226 and communicated with atmosphere.

Figure 5:
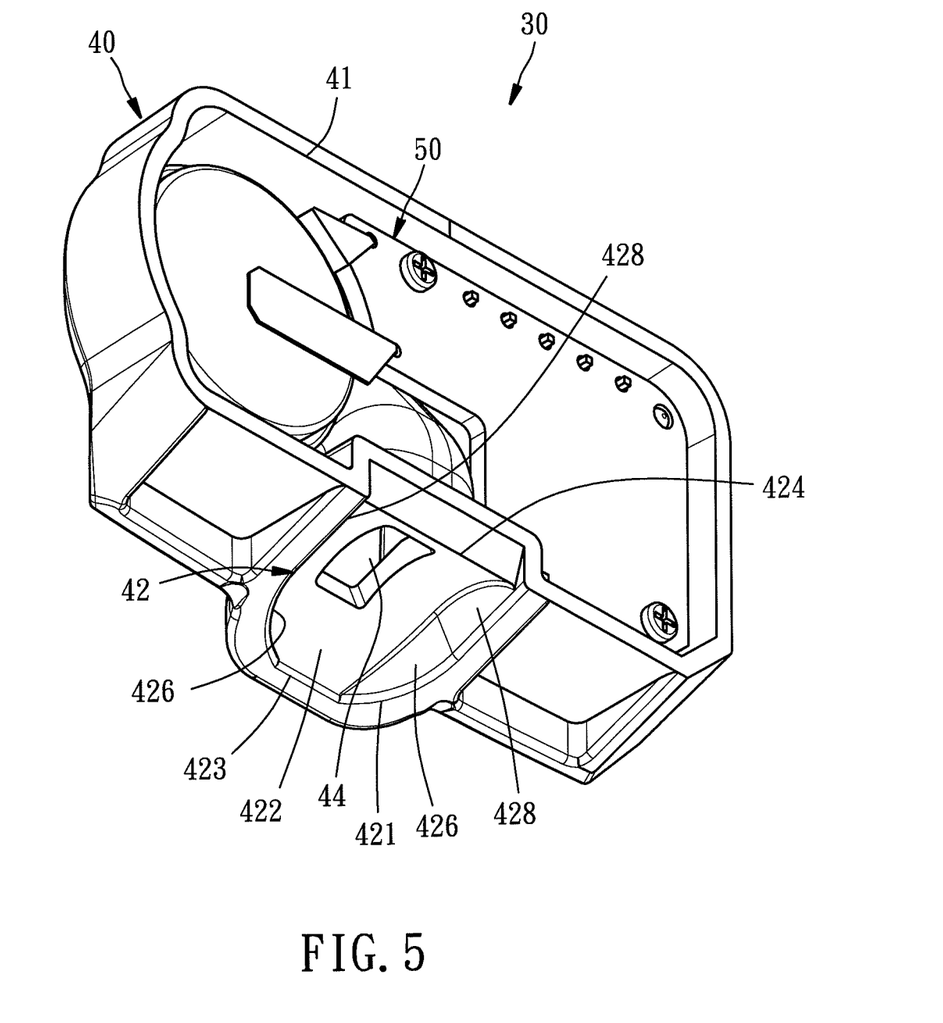
FIG. 5 is a perspective view of the tire pressure sensor of the assembly.

As shown in FIG. 5, the tire pressure sensor 30 includes a housing 40, a sensing unit 50 disposed inside the housing 40 for detecting air pressure and temperature, and a back plate (not shown) for covering a back open 41 of the housing 40. It will be appreciated that the structure and function of the sensing unit 50 are well-known prior art; therefore, no detailed description thereof is necessarily recited hereinafter. On the other hand, the bottom of the housing 40 is provided with a connection groove 42 with a bottom open 421 and a curved contact surface 422 facing the bottom open 421 and extending curvedly from a front edge 423 of the connection grove 42 to a back edge 424. Further, the housing 40 is provided with an elongated through hole 44 passing through the curved contact surface 422 of the connection groove 42 of the housing 40, and a stop portion 46 to be stoppable by the head of the bolt 60.

Referring to FIG. 5 again, in the housing 40 of the tire pressure sensor 30, the connection groove 42 has two lateral sidewalls that are faced with respect to each other and adjoined with two lateral edges of the curved contact surface 422. Each lateral sidewall includes a curved first stop surface 426 and a flat second stop surface 428. The two first stop surfaces 426 are connected with the front edge 423 of the connection groove 42 respectively and the two second stop surfaces 428 are parallel to each other and connected with the back edge 424 of the connection groove 42 respectively. The first stop surfaces 426 and the second stop surfaces 428 are stopped at the stop surface 226 so as to limit the stroke of movement of the connection portion 22 of the nozzle 20, such that the work of fastening the housing 40 with the muzzle can be done more conveniently.

Figure 6:
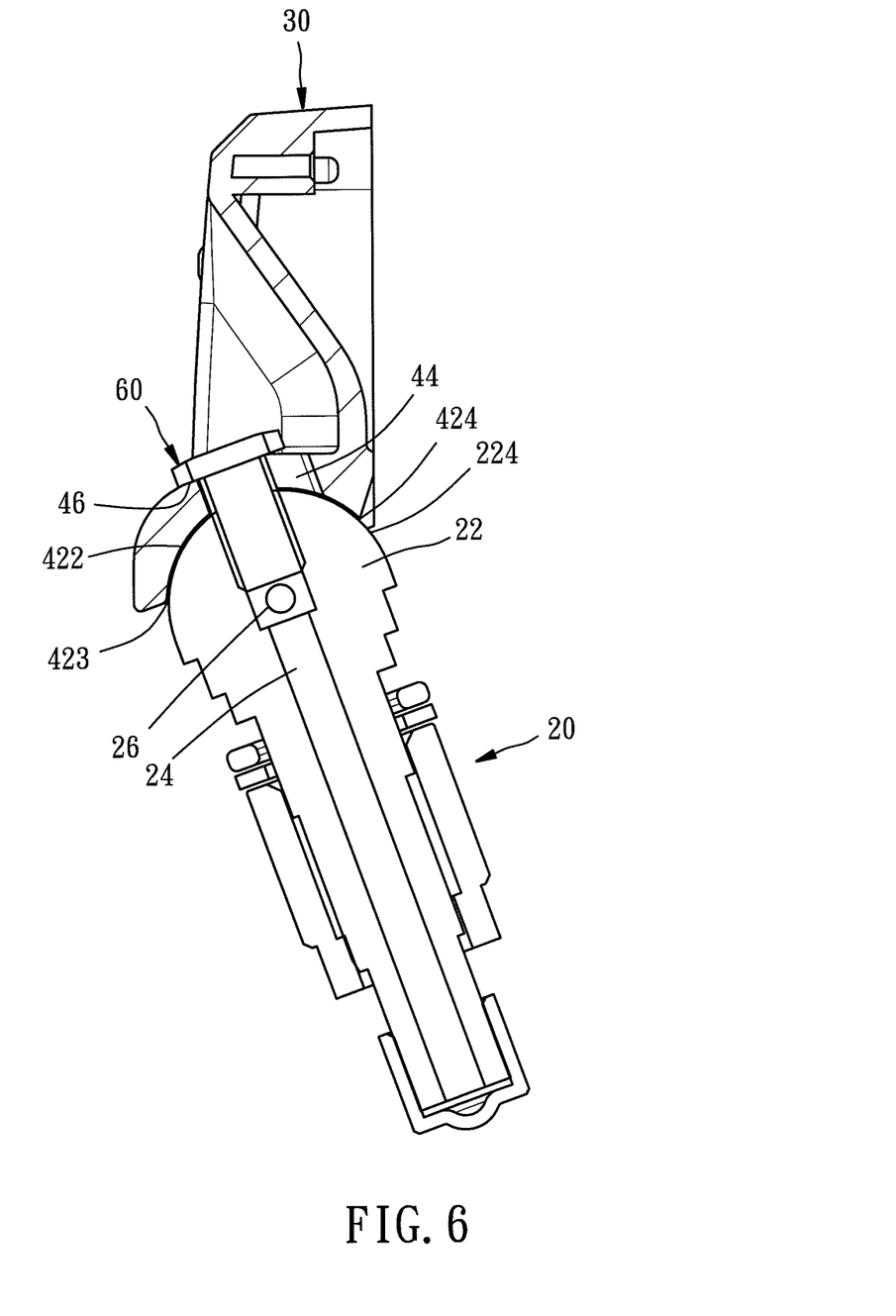
FIG. 6 is a sectional view taken along line 6-6 of FIG. 3.
Figure 7:
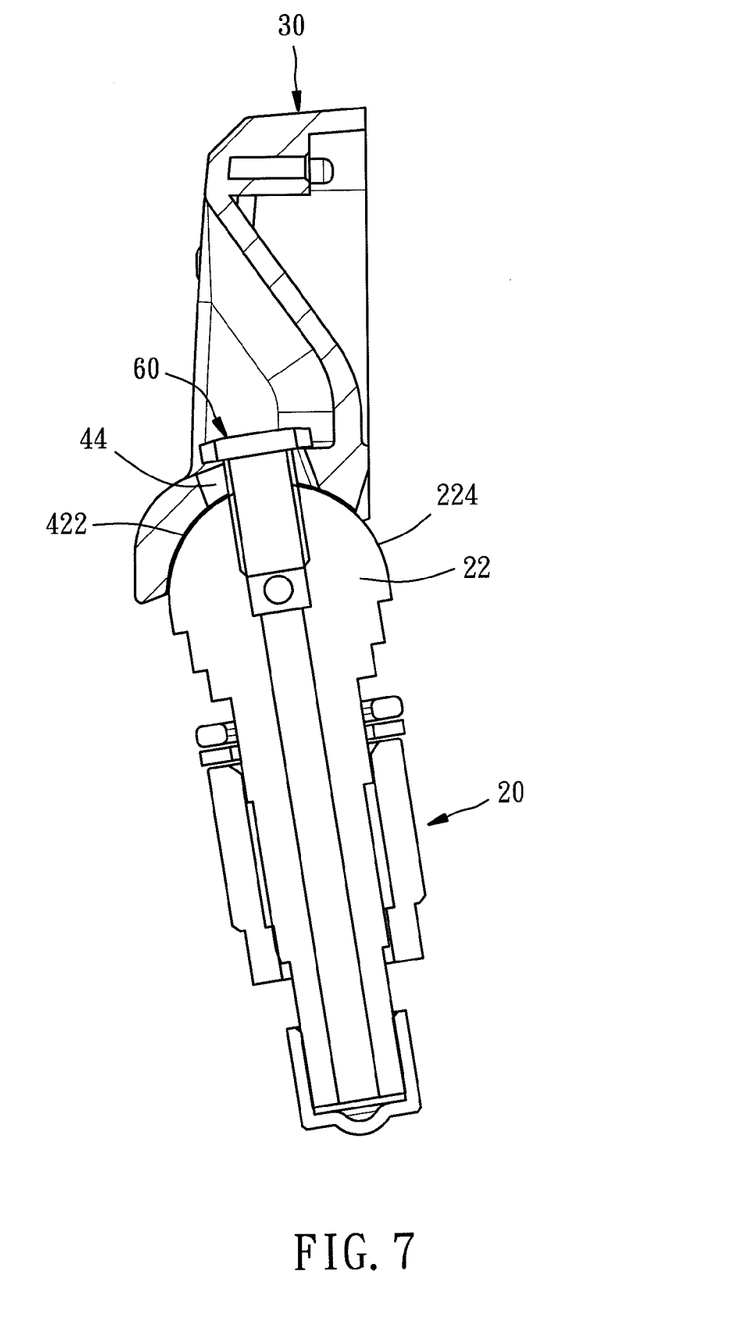
FIG. 7 is similar to FIG. 6, but showing that a relative connection angle between the tire pressure sensor and the nozzle is changed.

In assembly of the nozzle 20 with the tire pressure sensor 30, the connection portion 22 of the nozzle 20 is inserted into the connection groove 42 of the housing 40 of the tire pressure sensor 30 in such a way that the curved contact surface 224 of the connection portion 22 is complementarily and slidably connected with the curved contact surface 422 of the connection groove 42. In such a way, the curved contact surface 224 of the connection portion 22 can be forced to slidably move relative to the curved contact surface 422 of the connection groove 42 towards the front edge 423 or the back edge 424 so as to change the relative connection angle between the nozzle 20 and the housing 40 of the tire pressure sensor 30.

As soon as the relative connection angle is adjusted to a desired extend, the housing 40 of the tire pressure sensor 30 and the nozzle 20 can be fastened together by means of threadedly inserting the bolt 60 into the through hole 24 of the nozzle 20 through the elongated through hole 44 of the housing 40. It is to be mentioned that because the connection portion 22 of the nozzle 20 is limited to move in one specific direction only, the work of applying the bolt 60 can be done more easily. After completion of assembly, the inflation hole 26 of the nozzle 20 is exposed outside the tire pressure sensor 30, such that the compressed air that is introduced into the nozzle from the through hole 24 can be conducted through the inflation hole 26 into a tire (not shown) when the tire pressure sensor and nozzle assembly 10 is installed in the tire.

It will be appreciated that various modifications of the above-mentioned preferred embodiment can be realized to achieve the object of the present invention. For example, the curved contact surface 224 of the connection portion 22 of the nozzle 20 can have a gradually varied curvature other than the constant curvature as disclosed in the preferred embodiment and it can be eccentrically arranged. Further, in the preferred embodiment the curved stop surface 226 extends orthogonally with respect to the linear top ridge 221; however, it can be designed to extend with respect to the linear top ridge 221 at a predetermined included angle, that is, the connection portion 22 can be configured like a truncated solid cone having the curved contact surface.

In conclusion, the connection portion 22 of the nozzle 20 and the connection groove 42 of the housing 40 of the tire pressure sensor 30 can be easily manufactured and assembled with good accuracy, such that effect of firmly assembling the tire pressure sensor and the nozzle can be easily achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire pressure sensor and nozzle assembly, comprising:
a nozzle provided with a connection portion having a linear top ridge, a bottom portion opposite to the linear top ridge, and a curved contact surface which curvedly and downwardly extends from two opposite sides of the linear top ridge towards the bottom portion;
a tire pressure sensor provided with a housing having a connection groove in which the connection portion of the nozzle is disposed, the connection groove having a curved contact surface complementary to and slidable relative to the curved contact surface of the connection portion of the nozzle, and
a bolt penetrating through the curved contact surface of the housing of the tire pressure sensor and the curved contact surface of the connection portion of the nozzle to fasten the nozzle and the tire pressure sensor together,
wherein the connection portion of the nozzle has a stop surface stopped at the housing of the tire pressure sensor, and
wherein the stop surface of the connection portion of the nozzle has a curved shape.

2. The tire pressure sensor and nozzle assembly as claimed in claim 1, wherein the housing of the tire pressure sensor comprises an elongated through hole; the bolt passes through the elongated through hole and is threadedly inserted into the nozzle.

3. The tire pressure sensor and nozzle assembly as claimed in claim 2, wherein the nozzle includes a through hole into which the bolt is threadedly inserted.

4. The tire pressure sensor and nozzle assembly as claimed in claim 3, wherein the nozzle includes an inflation hole with an inner end communicated with the through hole of the nozzle, and an outer end communicated with atmosphere and exposed outside the tire pressure sensor.

5. The tire pressure sensor and nozzle assembly as claimed in claim 1, wherein the nozzle includes a through hole into which the bolt is threadedly inserted.

6. The tire pressure sensor and nozzle assembly as claimed in claim 5, wherein the nozzle includes an inflation hole with an inner end communicated with the through hole of the nozzle, and an outer end communicated with atmosphere and exposed outside the tire pressure sensor.

7. The tire pressure sensor and nozzle assembly as claimed in claim 1, wherein the connection groove of the housing of the tire pressure sensor has a curved first stop surface corresponding to the curved stop surface of the nozzle.

8. The tire pressure sensor and nozzle assembly as claimed in claim 1, wherein the stop surface of the connection portion of the nozzle extends with respect to the linear top ridge orthogonally or at a predetermined included angle.

9. The tire pressure sensor and nozzle assembly as claimed in claim 1, wherein the connection groove of the housing of the tire pressure sensor has two second stop surfaces, which are opposite to each other and correspond to the stop surface of the nozzle.

10. The tire pressure sensor and nozzle assembly as claimed in claim 9, wherein the two second stop surfaces are parallel to each other or extend with respect to each other at a predetermined included angle.

* * * * *